3,047,468
METHOD OF PREPARING Δ¹,⁴-3-KETO STEROIDS OF THE PREGNANE SERIES

Victor E. Origoni, Emerson, and Neil E. Rigler, Ridgewood, N.J., and Joseph J. Goodman, Nanuet, N.Y., assignors to American Cyanamid Company, New York, N.Y., a corporation of Maine
No Drawing. Filed June 6, 1961, Ser. No. 115,102
3 Claims. (Cl. 195—51)

This invention relates to a novel process for the preparation of useful steroid compounds. More particularly, it relates to a new process for the production of $\Delta^{1,4}$-9(11)-pregnatriene-3-one compounds from the corresponding 3β-acyloxy-9(11)-allopregnenes.

One of the more useful steroids of the present time is 9α - fluoro - 11β,16α,17α,21 - tetrahydroxy - 1,4 - pregnadiene-3,20-dione (triamcinolone) which possesses high anti-arthritic activity with little side effects. Therefore, an efficient economical synthesis of triamcinolone is highly desirable.

We have now found that triamcinolone can be prepared from a relatively inexpensive commercially available starting material such as 3β-acetoxy-9(11),16-allopregnadiene-20-one which is obtainable in good yield from Hecogenin (a sapongenin by-product of the sisal industry), Callow et al., Journal Chemical Society 4739–4743 (1956). The over-all process is as follows: 3β-acetoxy-9(11),16-allopregnadiene-20-one is converted to 16α,17α,21-trihydroxy derivative of the starting compound. This is followed by the simultaneous introduction of the Δ¹ and Δ⁴ bonds in the A ring and subsequent insertion of the halogen atom in the 9-position in the molecule by means of well known C ring reactions and finally deacetylation to produce the desired tetrahydroxy compound triamcinolone. This over-all reaction can be illustrated by the following flowsheet.

FLOWSHEET

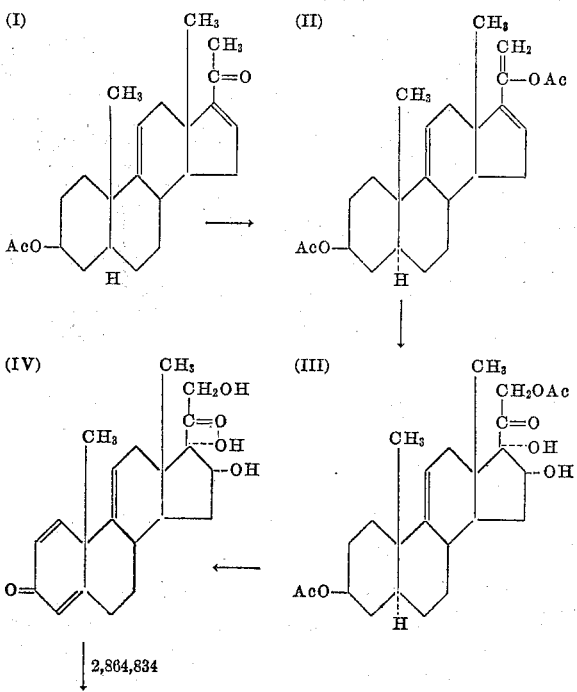

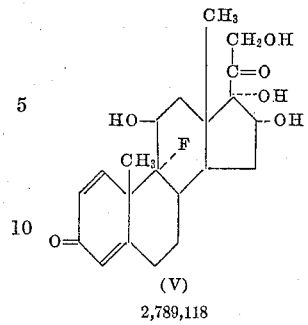

(V)
2,789,118 wherein Ac is a lower alkanoyl radical.

The process of the present invention is concerned with the unexpected reaction which takes place in the preparation of Compound IV from Compound III in the above flowsheet. This reaction involves the microbiological conversion of 3β,21-diacetoxy-16α,17α-dihydroxy-9(11)-allopregnen-20-one to 16α,17α21-trihydroxy-1,4,9(11)-pregnatriene-3,20-dione. This biological process is carried out by the use of the microorganism *Bacterium havaniensis* ATCC No. 4001.

It has been found that the biological conversion requires simply a 3-lower alkanoyloxy group or hydroxy, a saturated A ring and an unsaturated C ring such as one having a 9(11)-double bond. With these groups present, the allopregnene is readily converted into a Δ¹,⁴-3-one steroid. This reaction is unexpected since the presence of a 9α-fluoro-11β,16α,17α-dihydroxy compound in the 5α-configuration in a similar process produces only a Δ¹-3-one pregnene.

In carrying out the process of the present invention the microorganism *Bacterium havaniensis* ATCC No. 4001 (Lederle No. 316) is cultivated aerobically in a suitable nutrient medium with a steroid substrate such as defined above. During the growth of the microorganism under favorable conditions, 6-hydrogen atoms including the 5α-hydrogen atom are eliminated from A ring of the steroid and double bonds are thereby obtained at the 1,2-position and in the 4,5-position. While the exact mechanism of this multiple dehydrogenation is obscure, it appears to be the result of enzymes produced by the microorganisms during the fermentation process.

The microbiological process is carried out in a nutrient medium which comprises essentially an assimilable source of nitrogen in the form of vegetable and animal proteins, amino acids and so forth and an available source of carbon in the form of carbohydrates, starches, alcohols etc. Necessary trace amounts of minerals are usually present in sufficient quantity in the crude nutrients used. During the fermentation process, it is often desirable to add antifoaming agents such as glyceride oils, silicones, etc. These compounds can be added from time to time in the amounts needed to control foam. The period of growth of the microorganism elapsing before addition of the steriod substrate is not critical. The addition of the steroid substrate to the fermentation medium may be accomplished in any suitable manner such as in the form of a solution in a suitable organic solvent or in the form of a suspension either with or without a dispensing agent.

The temperature of the fermentation during the period of conversion of the steroid is usually that found suitable for the growth of the microorganism concerned which is from about 18° to about 37° C. It need be maintained only within such a range as supports life, active growth or the enzyme activity of the growth. The time required for the transformation of steroid substrate varies somewhat with the conditions and with the particular substrate employed. Usually a conversion period of 16 to 48 hours is most efficient from the standpoint of percentage yield. The amount of substrate added to the fermentation can be varied considerably, but is generally in the order of 0.1 to 1.0 gram per liter of fermentation medium.

The steroid substrates found useful in the process of the present invention which contain a 3β-acyloxy group, is saturated A ring and an unsaturated C ring include the following: 3β,21-diacetoxy-16α,17α-dihydroxy-9(11)-allopregnen-20-one; 3β,16α,21-triacetoxy-17α-hydroxy-9(11)-allopregnen-20-one; 3β,16α,17α,21-tetrahydroxy-9(11)-allopregnen-20-one and the like.

In order to study the rate of $\Delta^{1,4}$-conversion by paper chromatography, 10 ml. samples of fermentation mash are removed both at suitable intervals during the fermentation and after the conclusion of the fermentation process and extracted three times with separate 10 ml. volumes of ethyl acetate. The three extracts are pooled and the combined solution is then washed once with 2% aqueous sodium bicarbonate solution saturated with sodium chloride and then washed twice with saturated sodium chloride solution. The washed ethyl acetate is dried over anhydrous magnesium sulfate and filtered. The filtrate is concentrated at atmospheric pressure to a small volume. The concentrate is transferred to a 10 ml. volumetric flask and brought up to volume with ethyl acetate. The solution is used for characterization of steroid content by paper chromatography as described hereinafter. Two solvent systems can be employed. System I is prepared by shaking 2 volumes of benzene, 1 volume of denatured ethanol and 2 volumes of distilled water in a separatory funnel and then allowing the mixture to separate into two phases. A portion of the lower (stationary) phase is placed on the floor of a large glass cylinder. A portion of the upper (mobile) phase is placed in an open dish on the floor of the covered large glass cylinder. The remainder of the mobile phase is used to develop the chromatogram in the manner described below. System II is prepared in the same manner as System I; the difference being that System II consists of 2 volumes of benzene, 1 volume of acetone and 2 volumes of distilled water.

A standard steroid solution (or test solutions of unknown crystals) are prepared by dissolving 10 mgm. of the desired material in 10 ml. of ethyl acetate. At least one standard steroid solution is chromatographed simultaneously with a solution of an unknown. Exactly 0.025 ml. of the standard solution is applied to a Whatman #1 (or equivalent) paper chromatograph strip at the starting line which is four inches from the upper end of the strip. The strip is then folded over the upper edge of a trough supported in the covered large glass cylinder. Similarly, amounts ranging from 0.025 ml. to 0.100 ml. of the solution of unknown are applied separately to other strips which are likewise suspended. The trough permits development of many strips simultaneously. The strips are equilibrated for about 2 hours, then the desired developing solution (mobile phase of System I or System II) is used to fill the trough. Descending development at 27°±2° C. is allowed to proceed for about 4 hours. After proper development of the paper strips, they are removed from the apparatus and air dried before inspection under ultraviolet light. The strips are subsequently sprayed with a solution consisting of 4 grams of isonicotinic acid hydroxide dissolved in 1 liter of methanol and 5 ml. of concentrated hydrochloric acid. Color appears at the spots where the steroids are present. "Unknown" test strips are lined up with at least one "standard" strip and compared. The different steroids can then be identified by their respective positions on the strips.

At this point, it should be pointed out that this $\Delta^{1,4}$-conversion is subject to reversion on standing under anaerobic conditions for a period of time. Therefore, the harvest mash should be extracted promptly or the microorganism killed by pasteurization or an antiseptic.

Upon completion of the steroid fermentation, the converted steroid is recovered by extracting the fermentation harvest mash with an organic solvent for steroids, for example, methylene chloride, methyl isopropyl ketone, methyl isobutyl ketone, chloroform, trichloroethylene, ether, amyl acetate, ethyl acetate and the like. The fermentation harvest liquor and mycelium may be separated, for example by filtration, centrifugation, etc. and then separately extracted with suitable solvents. The extracts can be combined either before or after washing with an alkaline solution, for example, sodium bicarbonate, suitably dried as for example over anhydrous sodium sulfate, and the resulting purified transformed steroid obtained by recrystallization from organic solvents, by chromatography, etc. in order to isolate the thus obtained steroid from the other fermentation products.

The following detailed examples are illustrative of the process of the present invention and are not to be construed as limiting the process to these examples.

EXAMPLE 1

*Preparation of 3β,21-Diacetoxy-16α,17α-Dihydroxy-9(11)-Allopregnene-20-One (III)*

A 5.00 gram portion of the compound, 3β-acetoxy-9(11),16-allopregnadien-20-one (I) is dissolved in 400 ml. of isopropenyl acetate containing 0.60 gram of p-toluenesulfonic acid. The solvent is fractionated through a Vigreux column for 9 hours at 97° C. Approximately 70 ml. of isopropenyl acetate are collected. Twenty milliliter aliquots of the solvent are added twice during this period as partial replacements. The reaction is quenched with 5.0 grams of sodium bicarbonate and the material evaporated to dryness, then washed with 100 ml. of water to remove inorganic salts. The washed product is dried under vacuum at 40° C., yielding 5.76 grams of crude compound. Subsequent recrystallization from 30 ml. of methanol produces 4.69 grams of the pure enol acetate, 3β,20-diacetoxy-9(11),16,20-allopregnatriene (II).

A 4.50 grams quantity of 3β,20-diacetoxy-9(11),16,20-allopregnatriene (II) is dissolved in 225 ml. of acetone containing 0.9 ml. of glacial acetic acid and the solution cooled to 0° C. A solution of 3.68 grams of potassium permanganate in 135 ml. of 85% aqueous acetone (85:15 acetone:water) is added over a 20 minute period, with stirring, to the enol acetate solution. The reaction is allowed to proceed for an additional 30 minutes at 0° C. Excess permanganate is then reduced by the addition of 2.25 grams of sodium bisulfite dissolved in 54 ml. of water and the resulting manganese dioxide filtered and washed with 36 ml. of water. The filtrates are pooled, concentrated under vacuum at approximately 10° C. to a volume of approximately 75 ml. and aged at 0° C. for 2 hours. The crystals which are formed are collected by filtration. A yield of 3.30 grams of 3β,21-diacetoxy-16α,17α-dihydroxy-9(11)-allopregnen-20-one (III) is obtained.

EXAMPLE 2

*Preparation of 16α,17α,21-Trihydroxy-1,4,9(11)-Pregnatriene-3,20-Dione (IV)*

The microorganism *Bacterium havaniensis* ATCC 4001 is cultivated on an agar slant. The agar consists of Difco yeast extract, 3 grams/liter; Difco beef extract, 1.5 grams/liter; Difco peptone, 6.0 grams/liter; Dextrose (Cerelose), 1.0 gram/liter and agar 20 grams/liter. One loopful of the whole culture is added to 50 ml. of inoculum medium contained in a 250 ml. Erlenmeyer flask. The inoculum medium consists of Difco yeast extract, 5 grams/liter; Difco peptone 5 grams/liter; Difco Trytone, 5 grams/liter; calcium carbonate, 2.5 grams/liter and Dextrose (Cerelose) 20 grams/liter. The medium is grown at 25° C. for 24 hours. The resulting vegetative inoculum is added, on a 2% v./v. basis, to each of a series of forty 250 ml. Erlenmeyer flasks, each containing 50 ml. of a fermentation medium consisting of Sheffield N-Z Amine B, 1 gram/liter; Difco yeast extract, 0.5 gram/liter; Dextrose (Cerelose) 1 gram/liter and calcium carbonate 0.1 gram/liter. The inoculated flasks are incubated at 25° C. on a 185 r.p.m. rotary shaker for 24 hours. The compound, 3β,21-diacetoxy-16α,17α-dihydroxy-9(11)-allopregnen-20-one (III), dissolved in N,N-dimethylformamide, is added to the inoculated fermentation medium so that terminal concentration is 250 mcg. of steroid per ml. of medium. The fermentation flasks are subsequently incubated, under the same conditions, for an additional 16-hour period. At the termination of this incubation period, the 40 hour fermentation harvest mashes contained in the forty flasks are combined. The combined mash is extracted three times with one-third its volume of methyl isobutyl ketone. The three extracts are combined, washed with saturated aqueous saline solution, dried over magnesium sulfate and concentrated to dryness under reduced pressure. The residue thus obtained is chromatographed on a diatomaceous earth column employing water:dioxane:cyclohexane 1:5:4 as a development system. The desired fractions obtained from the column are combined and evaporated to dryness under reduced pressure. Crystallization from acetone:petroleum ether gives pure 16α,17α,21-trihydroxy-1,4,9(11)-pregnatriene-3,20-dione having the following physical characteristics λ$_{max.}$ (ethanol) 239 mμ;

$$\epsilon^{1\%}_{1\,cm.}\ 460$$

$[\alpha]_D^{22°}$ +8.6° (1%, CHCl$_3$).

We claim:

1. A process which comprises inoculating a nutrient medium containing assimilable carbon, nitrogen and mineral salts with a strain of the species *Bacterium havaniensis*, adding a steroid of the formula:

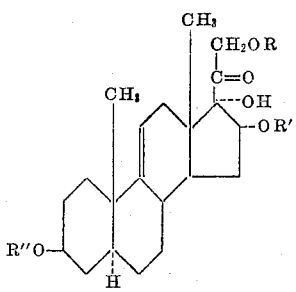

in which R, R' and R'' are selected from the group consisting of hydrogen and lower alkanoyl radicals, permitting the fermentation to proceed until a substantial amount of 16α,17α,21-trihydroxy-1,4,9(11)-pregnatriene-3,20-dione is produced and recovering said steroid therefrom.

2. A process for the preparation of 16α,17α,21-trihydroxy-1,4,9(11)-pregnatriene-3,20-dione which comprises the step of subjecting 3β,21-diacetoxy-16α,17α-dihydroxy-9(11)-allopregnen-20-one to the fermentative action of a strain of the species *Bacterium havaniensis*.

3. A process for the bio-conversion of 3β,21-diacetoxy-16α,17α-dihydroxy-9(11)-allopregnen-20-one to 16α,17α,21-trihydroxy-1,4,9(11)-pregnatriene - 3,20-dione which comprises the steps of inoculating a nutrient medium containing assimilable carbon, nitrogen and mineral salts with a strain of the species *Bacterium havaniensis* (ATCC 400) adding the substrate, permitting the fermentation to proceed until a substantial amount of 16α,17α,21-trihydroxy-1,4,9(11)-pregnatriene-3,20-dione is produced, and recovering said steroid therefrom.

References Cited in the file of this patent
UNITED STATES PATENTS 2,793,164     Fried et al. _____ May 21, 1957

OTHER REFERENCES

Prescott et al.: Industrial Microbiology, McGraw-Hill Book Co., Inc., 1959, pp. 725, 726, and 749.

Bergey's Manual, 6th edition, Williams and Wilkins Co., 1948, pp. 602, 915 and 918.

Bergey's Manual, 7th edition, Williams and Wilkins Co., 1957, p. 1018.